United States Patent [19]

Streck

[11] Patent Number: 4,916,296
[45] Date of Patent: Apr. 10, 1990

[54] LIGHT MODULATING SMART CARD

[75] Inventor: Donald A. Streck, Ojai, Calif.

[73] Assignee: Jerry R. Iggulden, Santa Clarita, Calif.; a part interest

[21] Appl. No.: 328,785

[22] Filed: Mar. 23, 1989

Related U.S. Application Data

[63] Continuation of Ser. No. 113,899, Oct. 29, 1987, abandoned.

[51] Int. Cl.⁴ .............................................. G06K 7/10
[52] U.S. Cl. ................................... 235/454; 235/491; 340/904; 340/936
[58] Field of Search ............... 235/454, 472, 487, 491, 235/462; 340/902, 904, 905, 936, 937, 942

[56] References Cited

U.S. PATENT DOCUMENTS

| | | | |
|---|---|---|---|
| 4,013,894 | 3/1977 | Foote et al. | 235/491 |
| 4,160,522 | 7/1979 | Dikinis | 235/473 |
| 4,379,280 | 4/1983 | Eshraghia | 340/936 |
| 4,389,172 | 8/1983 | Carroll et al. | 340/942 |
| 4,459,474 | 7/1984 | Waltor | 235/491 |
| 4,706,086 | 11/1987 | Panizza | 340/902 |
| 4,742,573 | 5/1988 | Popovic | 235/454 |

*Primary Examiner*—Philip H. Leung
*Assistant Examiner*—Jeffrey A. Gaffin
*Attorney, Agent, or Firm*—Donald A. Streck

[57] ABSTRACT

A smart card which transmits its stored data by means of light modulated by a spatial light modulating device. In one embodiment, the reader for the smart card includes apparatus for producing the beam of light and for directing it on the smart card and the card includes provision for directing the beam of light through the light modulator. For medical alert device use, and the like, the reader includes a slot for receiving the smart card directly therein. Optionally, reflectors or optic fibers can direct the light beam on the smart card. In one version, solar cell(s) carried by the smart card convert light incident thereon into power for the card. In a variation thereof, there is a light splitter for splitting the beam of light into a portion directed onto the solar cell(s) for producing power and a portion directed through the light modulator. In an active embodiment, the light modulator includes light producing apparatus for producing the beam of light as a modulated beam such as an infrared diode. Also disclosed is a smart card traffic enforcement system wherein a plurality of the smart cards are carried by the automobiles on the highway and contain information about the respective automobiles. The sensing apparatus adapted to be disposed adjacent the highway for reading the smart cards, for checking the legality of the associated automobile against preestablished legal conditions, and for causing a citation to be issued against automobiles operating in violation of legal conditions.

10 Claims, 8 Drawing Sheets

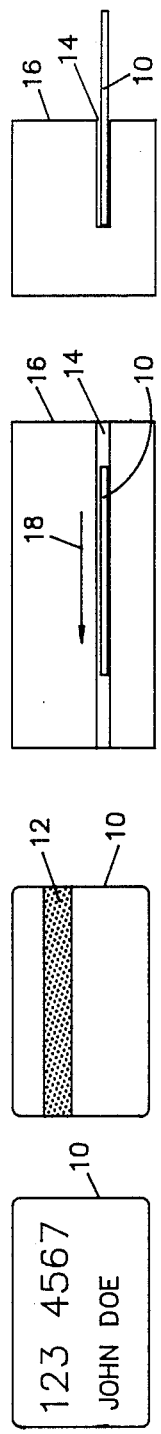

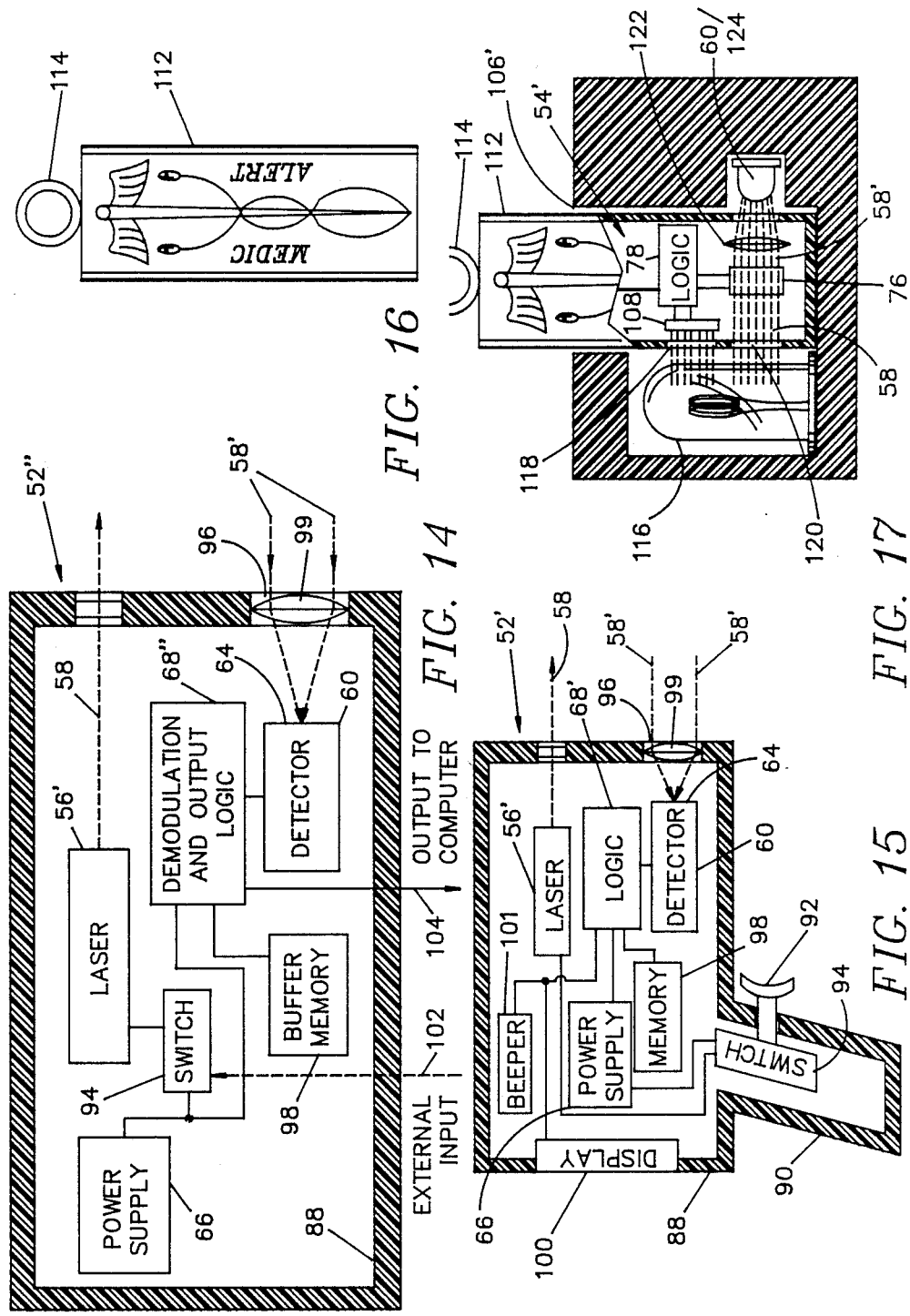

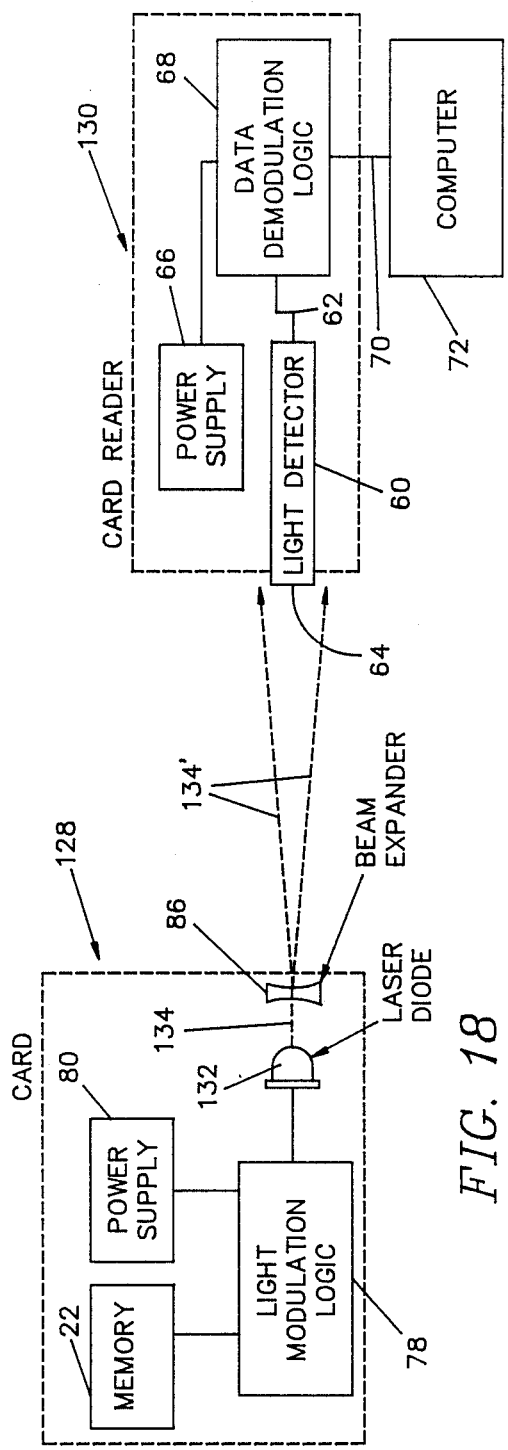
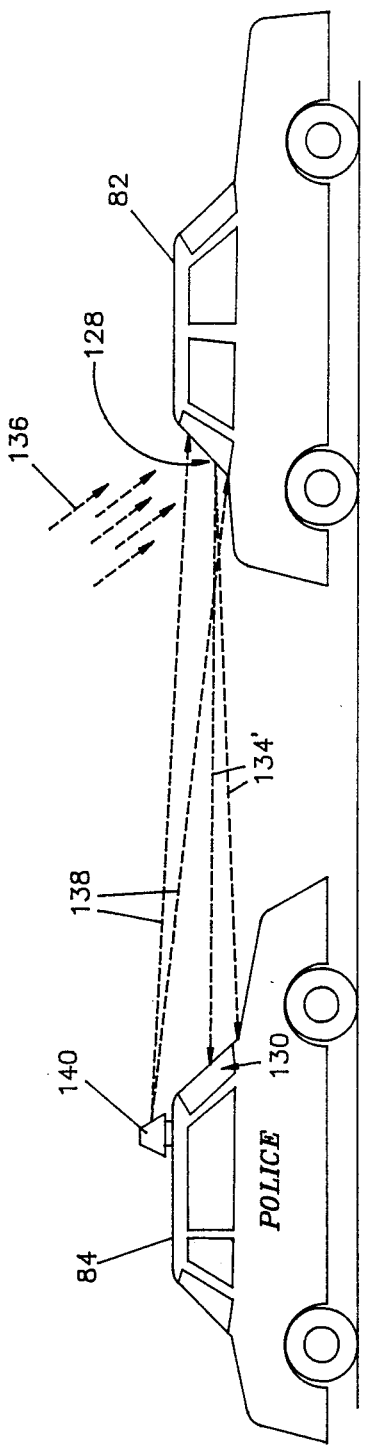
FIG. 18
FIG. 19

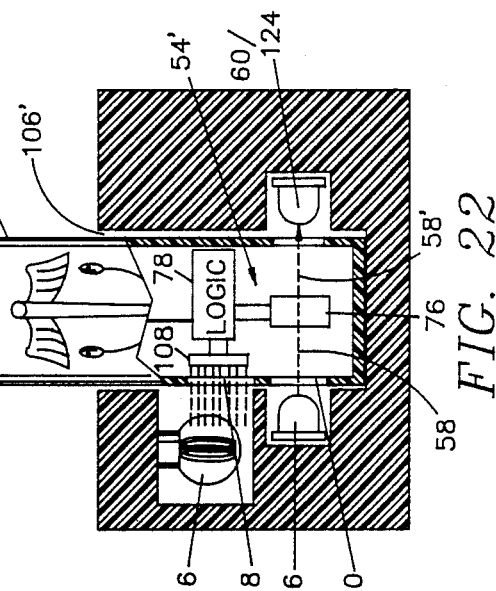
FIG. 30
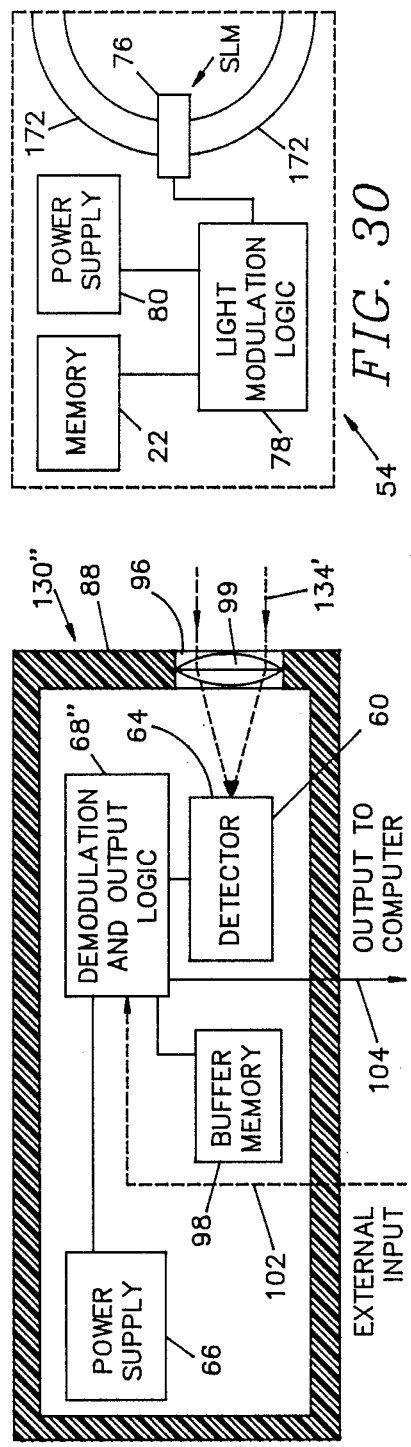
FIG. 20
FIG. 21
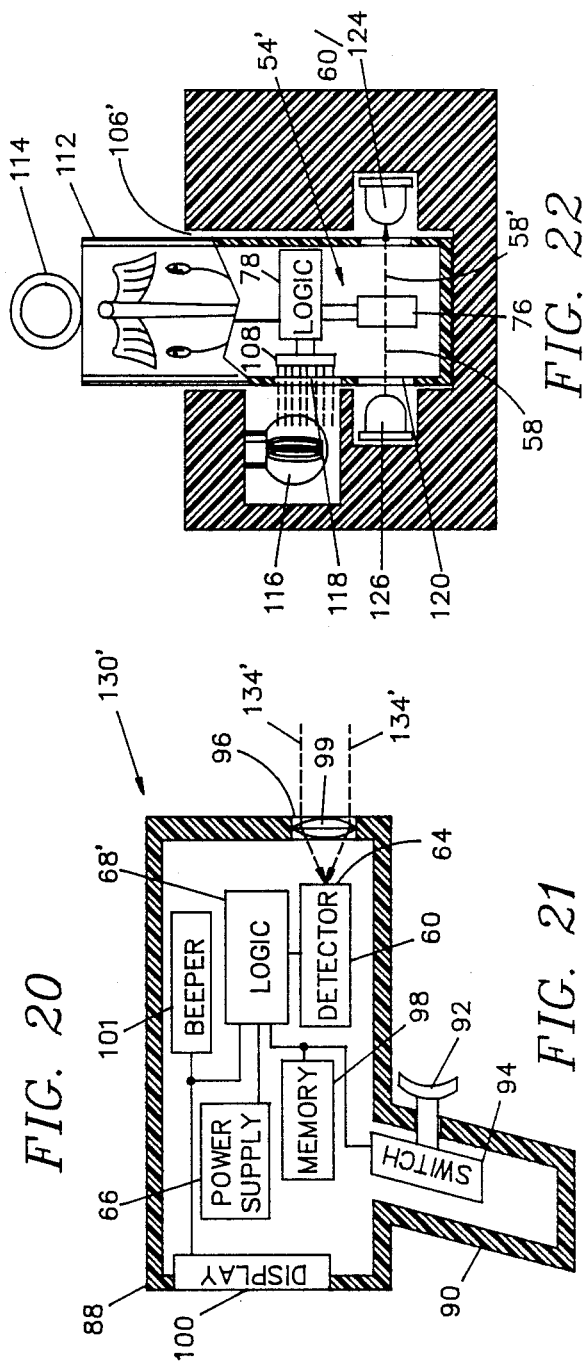
FIG. 22

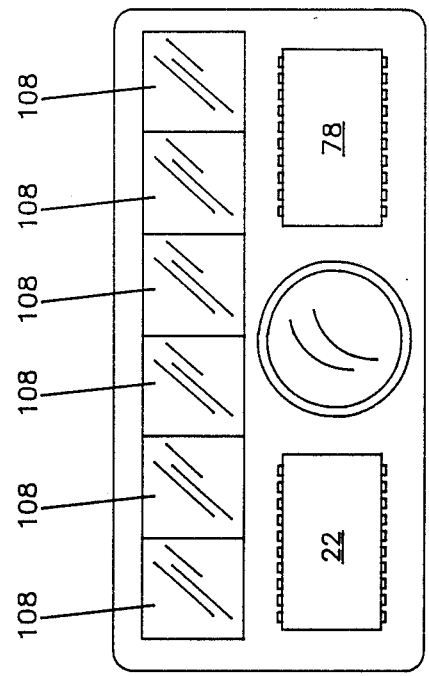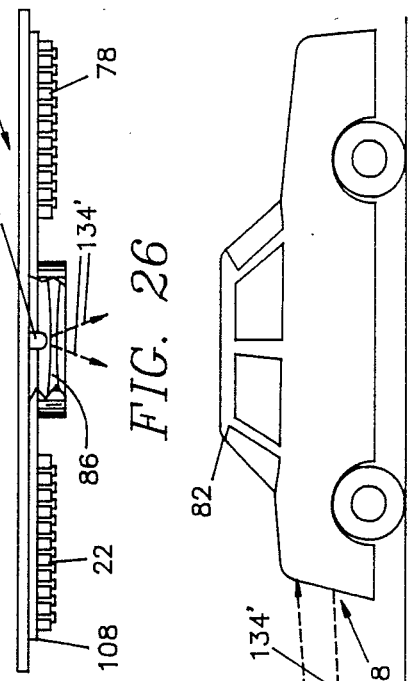
FIG. 23
FIG. 25
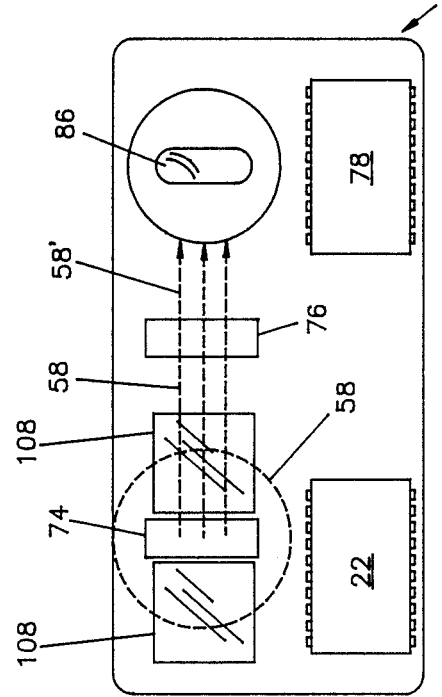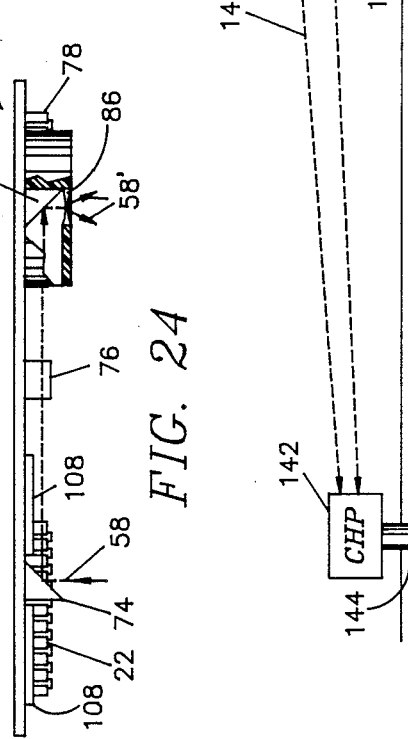
FIG. 24
FIG. 26
FIG. 27

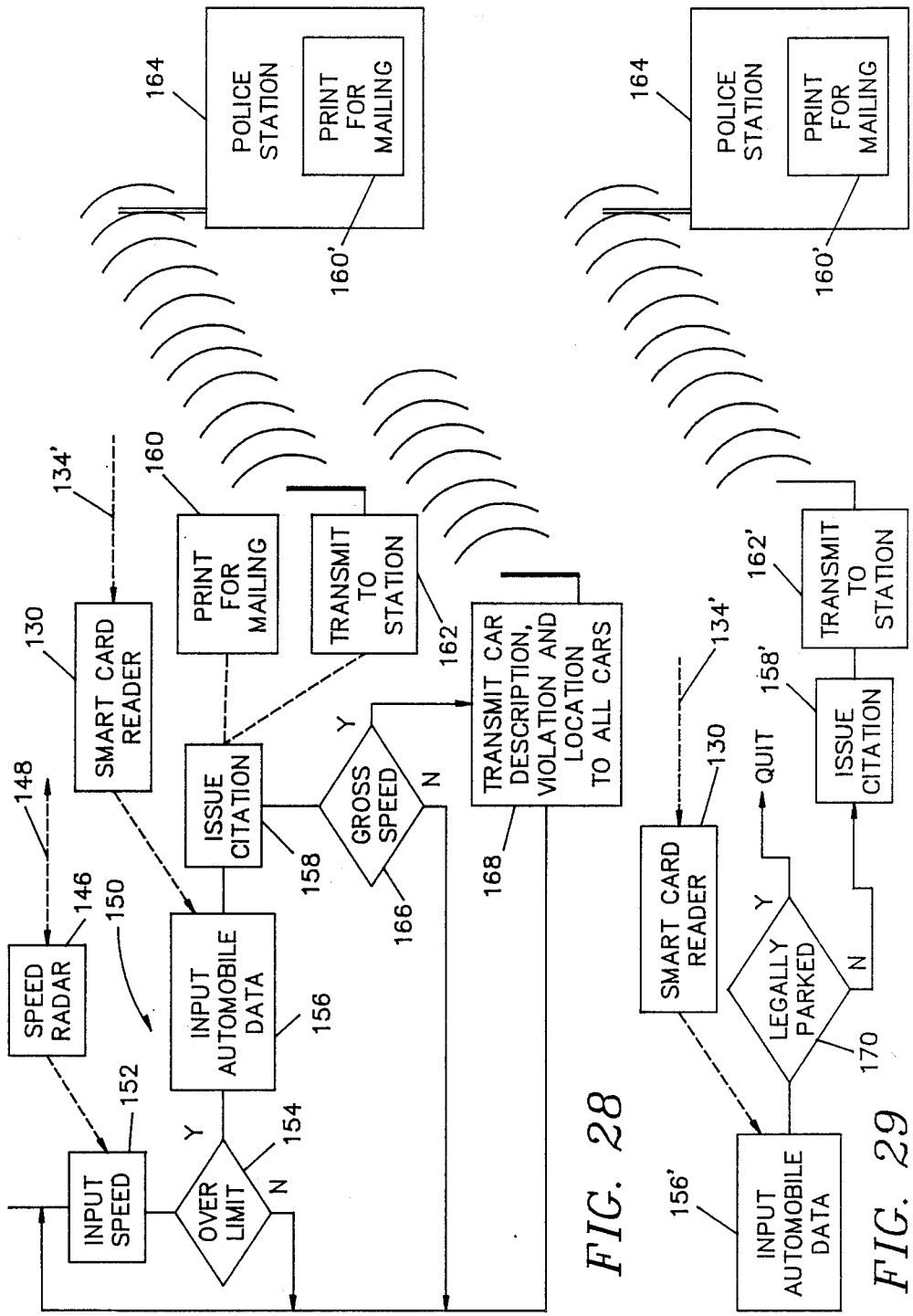

LIGHT MODULATING SMART CARD

This is a continuation of application Ser. No. 113,899, filed 29 Oct. 1987, now abandoned.

BACKGROUND OF THE INVENTION

The present invention relates to smart cards and, more particularly, to a smart card which transmits its stored data by means of modulated light and comprising, memory means for holding the data as digital information; power supply means operably connected for supplying power to the components of the smart card; and, light modulation means for modulating a light beam with the data in the memory and emitting the modulated light beam for subsequent detection and demodulation.

Technology related to cards containing information which is retrievable has taken a quantum leap in recent years. In the not-too-distant past, the common "credit card" 10 of FIG. 1 has had a magnetic strip 12 applied to the back surface onto which information can be stored magnetically in the manner of magnetic recording tape, and the like as depicted in FIG. 2. The information on the magnetic strip 12 is easily read by manually moving the card 10 through a slot 14 in a reader 16 as indicated by the arrow 18 in FIGS. 3 and 4. A read head (not shown) contained within the reader 16 develops an electronic signal as the magnetic strip 12 is moved past it. More complex readers are, of course, available such as those contained in the automated teller machines (ATMs) placed for convenience at banks and elsewhere. While an ATM mechanically inputs and processes the credit card 10, the principle is still the same, i.e. the magnetic strip 12 is moved past a read head contained within the ATM.

More recently, much emphasis has been placed on so-called "smart cards". While the magnetic strip 12 of the credit card 10 of FIGS. 1 and 2 is only able to contain a small quantity of magnetically encoded information, the smart card is capable of storing and providing literally thousands (and in some cases, millions) of bits of information. Because of their ability to store and supply such large quantities of information, smart cards are becoming associated with much broader fields of use than as a simple interface medium for credit and banking transactions. For example, in Japan (where much of the smart card technology has been developed) automobile manufacturers are associating a smart card with each automobile in the process of assembly. As the car moves along the automated assembly line, the smart card provides information to the various robotic units performing the actual assembly work. A typical smart card employed in such automated processes is shown in FIG. 5 wherein it is generally indicated as 20. The data is contained in a memory 22 which can be of the random access memory (RAM) variety or the electronically programmable read only memory (EPROM) variety. RAM, of course, is easily written but subject to magnetic erasure in the same manner as the magnetic strip 12 of FIG. 2 or other magnetic recording mediums such as audio cassettes, and the like. EPROM, on the other hand, is more difficult to write initially (or modify subsequently) and such writing must be done with special equipment provided for the purpose; however, it is thereafter not easily unintentionally erasable, as by accidental exposure to a magnetic field.

The smart card 20 contains digital logic 24 connected to the memory 22, a power supply 26, and a radio frequency (RF) transmitter 28. The transmitter 28 is connected to an antenna 30 and the power supply 26 is connected to a coil 32. As the automobile carrying card 20 moves along the assembly line, it is activated by RF energy 34 at a frequency $f_1$ which induces a voltage into the coil 32, which is then used by the power supply 26 to drive the remaining components. The logic 24 accesses the data from the memory 22 and transmits it as RF energy 36 at a different frequency $f_2$ from the antenna 30, from whence it is picked up by the adjacent robotics gear and used in the assembly process.

As can be appreciated, the above-described RF-activated, passive, smart card 20 is expensive to produce, as is the transmitter/receiver associated therewith. Since its use is on a limited basis and in a highly profit-oriented environment wherein the relative costs are insignificant, however, these problems cause little concern. Moreover, the fact that the transmitter/receiver has to be within a few feet of the card 20 to activate it and receive the transmission therefrom, is also of little consequence because of the controlled environment wherein it is used. As can also be appreciated, however, outside of its exclusive environment, the smart card 20 of FIG. 5 is of limited practical application.

An even more recent development in the general area of smart cards is the so-called "unified" card of FIG. 6. Like smart cards, unified cards, such as that indicated as 38 in FIG. 6, contain a computer chip (i.e., digital logic 24 and memory 22); but, additionally, unified cards add a battery 40 for power, a two-line display screen 42, and a keyboard 44, so users can enter and read information without a computer terminal. Their primary use is in financial transactions and records; however, they are finding much use in portable data collection applications. In essence, the unified card 38 is a micro-miniature computer into which data can be entered at a remote location for subsequent input into a larger computer through an electrical contact 46 connected to the logic 24. There are reports that at least one manufacturer is attempting to (or actually has) put a transmitter 28 and antenna 30 onto a unified card 38', as shown in FIG. 7, such that as the information is input to the card 38' at the remote location it is simultaneously input to the computer via an RF link.

Finally, as depicted in FIG. 8, there is a class of so-called "holographic" smart cards 48 wherein the information is written into the plastic of the card 48 in area 50 in the manner that the data is written into a so-called "compact disc". The information within the data area 50 is read by passing a light beam therethrough in a scanning fashion to detect the light-passing and light-blocking pixels within the area 50. While the holographic smart card 48 of FIG. 8 much simpler than the smart card 20 of FIG. 5 and unified cards 38, 38' of FIGS. 6 and 7 and can store millions of bits of information, it suffers from two major drawbacks. One, unlike the RAM and EPROM magnetic memories, the data within the area 50, once written, is unchangeable. Additionally, the reading apparatus is complicated, expensive, and prone to errors in attempting to read the data within the area 50.

Thus, as can be appreciated from the foregoing description of the prior art, the present state of smart card technology is such that both the cards and readers are complex, expensive, and unable to be read from any distance greater than a few feet away.

Wherefore, it is the object of the present invention to provide a family of smart cards employing modulated light for the transmission of data which are simple, inexpensive, and readable from extended distances.

Other objects and benefits of the present invention will become apparent from the description contained hereinafter taken in conjunction with the drawing figures which accompany it.

SUMMARY

The foregoing objects have been achieved by the smart card of the present invention which transmits its stored data by means of modulated light and comprises, memory means for holding the data as digital information; power supply means operably connected for supplying power to the components of the smart card; and, light modulation means for modulating a light beam with the data in the memory and emitting the modulated light beam for subsequent detection and demodulation.

In one embodiment, the reader for the smart card includes light producing means for producing the beam of light and for directing it on the smart card and the card includes means for directing the beam of light through the light modulating means. In one variation thereof for use with medical alert devices, and the like, the reader includes a slot for receiving the smart card therein with light sensing means and the light producing means being disposed on either side of the slot and the means for directing the beam of light through the light modulating means comprises a passageway through the card disposed between the light sensing means and the light producing means when the card is disposed in the slot, the light modulating means being disposed in the passageway. In another variation thereof for remote reading applications, the means for directing the beam of light through the light modulating means comprises a first reflector for receiving the beam of light and for directing it through the light modulating means and a second reflector for receiving the beam of light from the light modulating means and for directing it back towards the reader. Optionally, fiber optics can replace the reflectors.

In various options (1) solar cell means are carried by the smart card and operably connected to the light modulating means for converting light incident thereon into power for use by the light modulating means in performing it functions; (2) light splitter means are positioned for splitting the beam of light into a portion directed onto the solar cell means for producing power and a portion directed through the light modulating means; and, (3) buffer memory means are disposed in the reader for receiving and holding the data demodulated by the light sensing means.

In another embodiment, the light modulating means includes light producing means for producing the beam of light as a modulated beam.

Also included is a smart card traffic enforcement system comprising a plurality of the smart cards of the present invention carried by respective ones of the automobiles on the highway and containing information about the respective automobiles and sensor means disposed adjacent the highway for reading the smart cards, for checking the legality of the associated automobile against pre-established legal conditions, and for causing a citation to be issued against automobiles operating in violation of legal conditions.

DESCRIPTION OF THE DRAWINGS

FIG. 1 is a simplified drawing of the front of a prior art credit card.

FIG. 2 is a simplified drawing of the back of the credit card of FIG. 1 showing the addition of a magnetic strip thereto for containing digital information.

FIG. 3 is a front view of a manual reader for reading the magnetic strip on the card of FIG. 2.

FIG. 4 is an end view of the reader of FIG. 3.

FIG. 5 is a simplified drawing of a prior art smart card which is activated by one radio frequency and transmits its information at a second radio frequency.

FIG. 6 is a simplified drawing of a unified card according to the prior art.

FIG. 7 is a simplified drawing of the unified card of FIG. 6 modified to include a transmitter and antenna in the manner of the smart card of FIG. 5.

FIG. 8 is a simplified drawing of a prior art holographic smart card.

FIG. 14 is a more detailed block diagram of a permanent card reader employing the technology of FIG. 9.

FIG. 15 is a more detailed block diagram of a portable card reader, in the manner of FIG. 14.

FIG. 16 is a drawing of a medical alert type device to be worn by an individual and employing the technology of the present invention as shown in FIG. 11.

FIG. 17 is a cutaway view of the medical alert device of FIG. 16 inserted into a reader therefore.

FIG. 18 is a simplified drawing of a system according to the present invention in an alternate embodiment wherein the card produces its own light beam.

FIG. 19 is a drawing in the manner of FIG. 10 showing a police car employing the technology of FIG. 18 to gather information about another automobile.

FIG. 20 is a more detailed block diagram in the manner of FIG. 14 of a permanent reader for the technology of FIG. 18.

FIG. 21 is a detailed block diagram in the manner of FIG. 15 of a portable reader for the technology of FIG. 18.

FIG. 22 is a partially cutaway view through a medical alert device and reader in the manner of FIG. 17 showing an alternate configuration for the reader.

FIG. 23 is a front view of a smart card according to the present invention employing the technology of FIG. 9.

FIG. 24 is a top view of the card of FIG. 23.

FIG. 25 is a front view of a smart card according to the present invention employing the technology of FIG. 18.

FIG. 26 is a top view of the smart card of FIG. 25.

FIG. 27 is a drawing showing a traffic speed enforcement system according to the present invention and incorporating the smart card thereof.

FIG. 28 is a logic-oriented block diagram of the system of FIG. 27.

FIG. 29 is a logic-oriented block diagram of a modification of the system of FIG. 27 to provide a system for parking enforcement.

FIG. 30 is a drawing of the card portion of FIG. 9 with fiber optics substituted for the reflectors in an alternate embodiment.

DESCRIPTION OF THE PREFERRED EMBODIMENT

The present invention is based on the transmission of data by means of a modulated light beam. The transmission of data on a modulated light beam is, per se, not novel. On a small scale, many households already employ such technology in the form of the remote control device employed with television sets, video cassette recorders, and the like wherein a modulated infrared (IR) light beam is employed to control the various devices. On the high technology end, IR data links are commercially available for transmitting, for example, computer data between buildings, and the like. The present invention approaches the problem in two alternate ways. In one general embodiment, the light beam is provided by the card reader and the card modulates and reflects the incident beam back to the reader. In the other general embodiment, the light beam source is contained on the card itself and the card transmits a modulated light beam.

Figure 9:
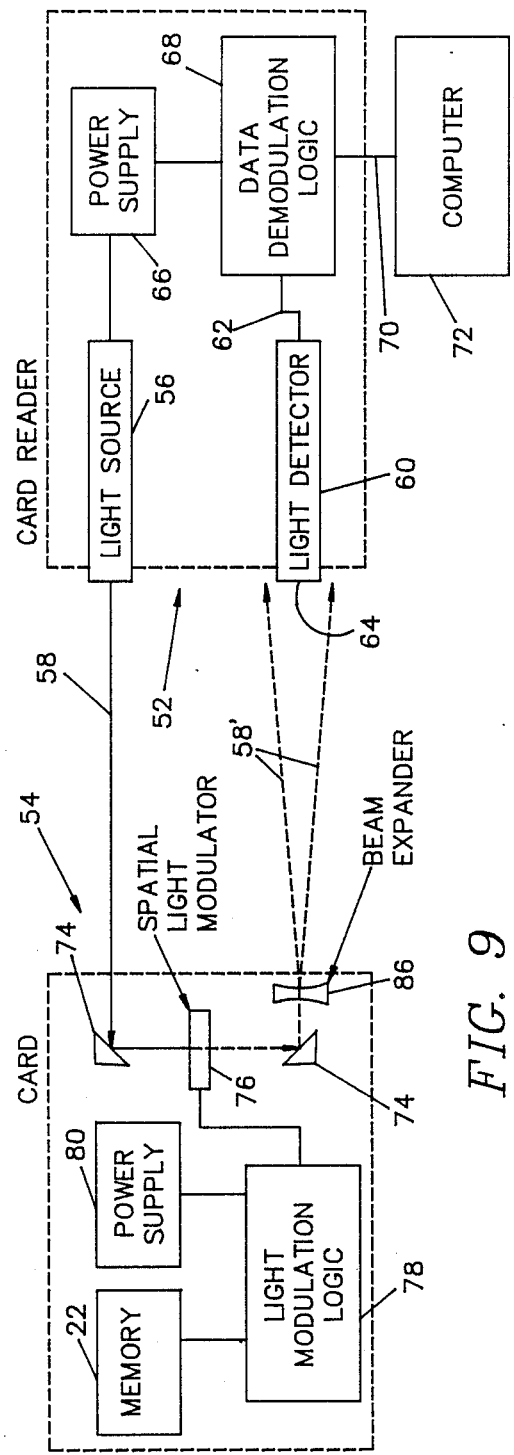
FIG. 9 is a simplified drawing of one embodiment of the present invention readable at a distance wherein a light beam from the reader is reflected back to the reader by the card after having the data modulated onto the incident light beam.

A system according to a first embodiment of the present invention of the type wherein a light beam is reflected and modulated is shown in FIG. 9. There is a reader 52 and a card 54. The reader 52 contains a source 56 of a light beam 58 and a light detector 60 which outputs an electrical signal on output line 62 in response to light striking a sensitive surface 64 thereof. There is a power supply 66 providing the necessary power to the light source 56 and data demodulation logic 68. The output 62 of the light detector 60 is connected as an input to the data demodulation logic 68. The data demodulation logic 68, in turn, has an output 70 connected at an input to a computer 72 which used the data. The computer, per se, is not part of the present invention, merely a user of the data.

The card 54 has a pair of reflectors 74 positioned to reflect and return an incident light beam 58 180° back towards the source of the beam. An alternate arrangement for this embodiment is shown in FIG. 30 wherein the reflectors 74 are replaced by sections of fiber optic conductors 172. The reflectors 74 are spaced apart and a spatial light modulator (SLM) 76 is positioned between them so that a light beam 58 passing between the reflectors 74 passes through the SLM 76. As with the prior art smart card 20 of FIG. 5 and unified cards 38, 38' of FIGS. 6 and 7, card 54 contains a memory 22 containing the data of interest. As with the prior art devices, memory 22 can be either ROM or EPROM (or any other accessible digital memory device), as desired. The memory 22 is connected to digital light modulation logic 78 which, in turn, is connected to a power supply 80 and the SLM 76. The power supply 80, of course, provides power to the light modulation logic 78 for its internal operation as well as operation of the SLM 76. SLM 76 is any one of several such devices well known to those skilled in the optical arts and is best characterized by the liquid crystal display (LCD) employed in most digital wrist watches. By changing the voltage polarity to the SLM 76, it can be made to rapidly change from light-passing to light-blocking states whereby a light beam 58 passing therethrough can be modulated in the same manner as with a mechanical shutter; however, at speeds approaching computer clock speeds.

Figure 10:
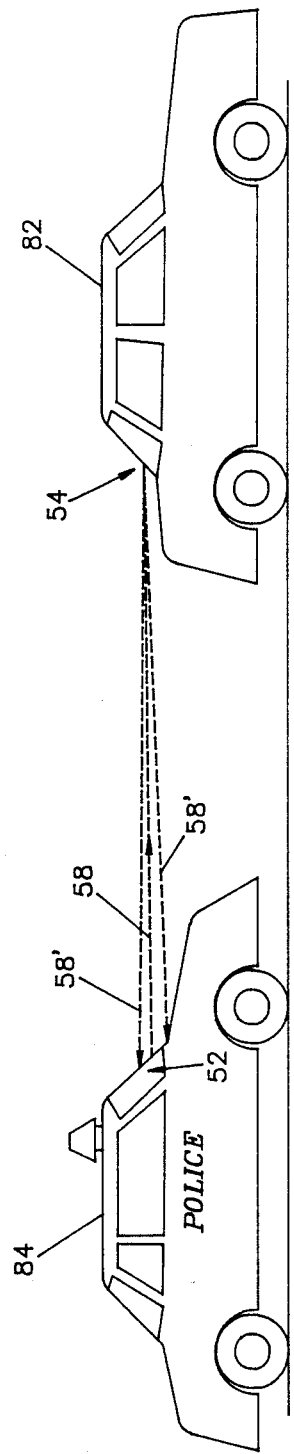
FIG. 10 is a simplified drawing showing the manner in which the system of FIG. 9 can be employed by police to get information about an automobile at a distance (even when moving) when the card of FIG. 9 is employed in lieu of or in addition to a standard license plate.

One contemplated use and method of operation of this embodiment of the present invention is shown in FIG. 10. The card 54 of FIG. 9 is mounted at the rear of an automobile 82 either in addition to or in lieu of a standard license plate. A good place for mounting would be as part of the third stoplight now required for automobiles. The card 54 could be issued and/or updated by the Department of Motor Vehicles as part of the vehicle registration process and would contain all vital information on the automobile 82 such as registered owner, date of last registration, insurance company (optional), and the like. Detailed drawings of this particular embodiment as visualized in front and top views are shown in FIGS. 23 and 24. To secure information on the automobile 82, the police car 84 contains a reader 52 as in FIG. 9 from which light beam 58 is directed onto the card 54 of the automobile 82. It is contemplated that light source 56 may comprise a laser such that light beam 58 will be of relatively small diameter. Accordingly, in such case, it is contemplated that a beam expander lens 86 would be disposed in the path of the modulated beam 58' following the second reflector 74 such that a portion of the expanded returning beam would strike the sensitive surface 64 of the light detector 60 causing an associated signal on line 62 into the data demodulation logic 68. If the fiber optic conductors 172 of FIG. 30 were employed, the expander lens 86 could be formed into the exiting end thereof according to techniques well known in the art. In either event, logic 68 would then demodulate the signal from line 62 to produce the binary data therefrom which, in turn, would be sent to computer 72. In this regard, investigation by the applicant indicates that the power level and performance of YAG and HeNe lasers would be appropriate for such longer range reading applications of the present invention without the potential for causing eye damage, or the like.

A hand-held reader 52' of a type which could be employed by the officers within the police card 84 of FIG. 10 is shown in FIG. 15. As shown therein, there is a case 88 having a handle 90 for gripping and a trigger 92 connected to a switch 94 by means of which the operation of the reader 52' can be controlled. When the switch 94 is depressed, the laser light source 56' outputs light beam 58 which is aimed at the card 54 of the automobile 82. The returning light beam 58' entering opening 96 is focused by a lens 99 onto the sensitive surface 64 of the detector 60. The logic 68' is connected to a beeper 101 which provides an audible sound to the user when a return link has been established between the reader 52' and the card 54 being read. Logic 68' inputs and demodulates the data from the memory 22 of the card 54 and stores it sequentially into its own buffer memory 98, from whence it can be subsequently retrieved and displayed on display 100 for viewing by the officer. As those skilled in the art will appreciate, the data as transmitted will include header block information indicating the start of the data and the amount thereof in the usual manner for such data transmissions, and the like. In the interest of simplicity and to avoid redundancy, this aspect which forms no part of the novelty of the present invention will not be addressed further.

A permanent reader 52" as could be employed on an assembly line employing this version of the present invention is shown in FIG. 14. Like components to the portable unit of FIG. 15 are labelled with like numbers. In this case, the switch 94 is activated by an external input 102 from, for example, a robotics computer (not shown) and there is a line 104 connected from the logic 68" back to the robotics computer to provide the data read from the card 54 thereto.

Figure 12:
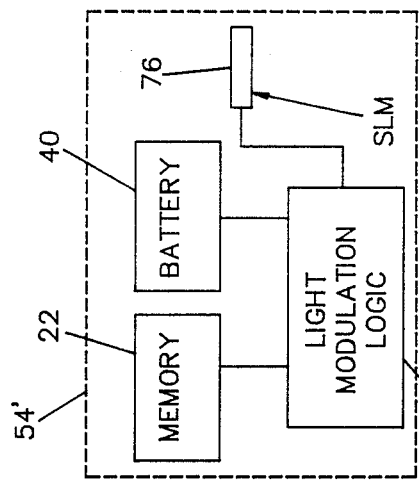
FIG. 12 is a simplified drawing of one card type for use in the system of FIG. 11 wherein the power is supplied by a battery.
Figure 13:
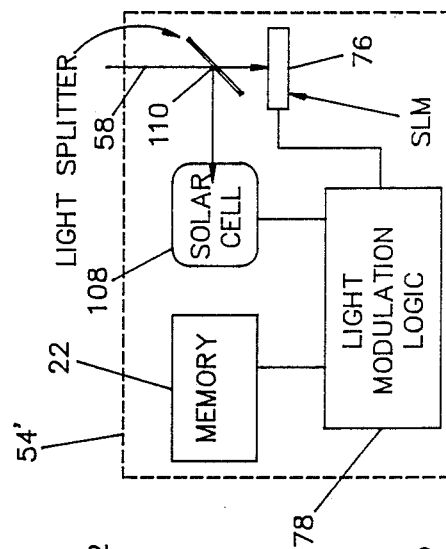
FIG. 13 is a simplified drawing of an alternate card for use in the system of FIG. 11 wherein the energy for operation of the card is supplied by a portion of the incident light beam being modulated.
Figure 11:
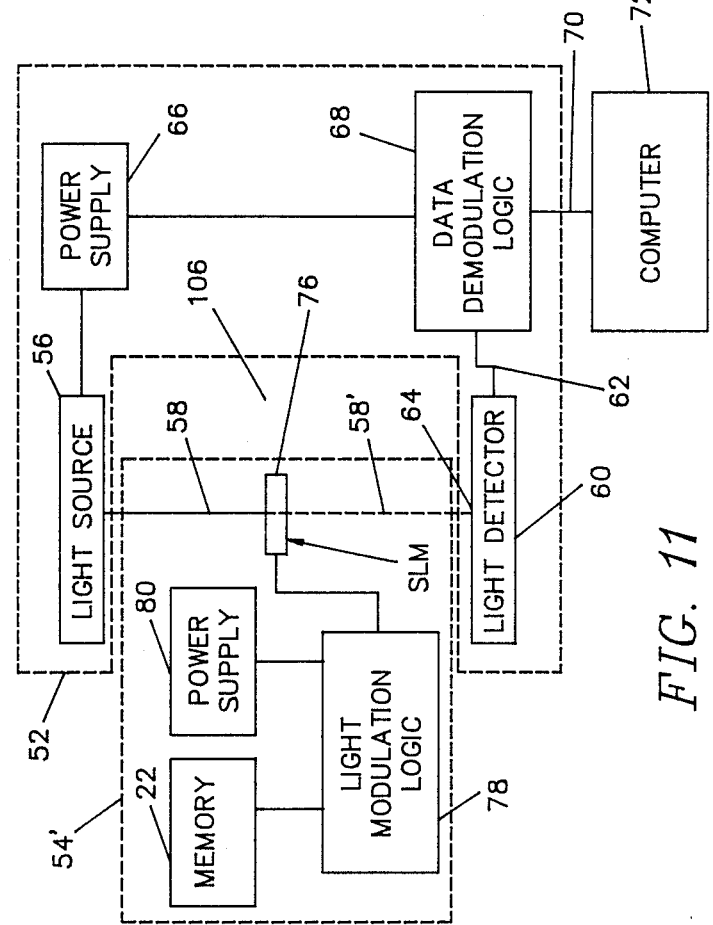
FIG. 11 is a simplified drawing of a smart card system according to the present invention wherein the card is intended to be placed into a reader for reading.

Turning now to FIGS. 11-13, an alternate embodiment according to this basic approach of the present invention is shown. In this embodiment, the card 54' must be positioned within the reader 52 in order to read the data therefrom. As can be seen, card 54' is substantially identical to card 54 of FIG. 9 except that the reflectors 74 and the beam expander 86 have been removed. Likewise, card reader 52 of FIG. 11 is substantially identical to card reader 52 of FIG. 9 except that the light beam 58 from the source 56 is directed onto the sensitive surface 64 of the light detector 60 and a slot 106 is provided in the reader 52 into which the card 54' can be inserted to place the SLM 76 in alignment with the light beam 58. With the card 54' in the slot 106, the light beam 58 is modulated by the logic 78 to impress the data within memory 22 thereon. In all other regards, the system of FIG. 11 operates in the same manner as the system of FIG. 9.

It is contemplated that the power supply 80 of either FIG. 9 or FIG. 11 can comprise a battery 40 as shown in FIG. 12 or, as is preferred, a solar cell 108 which can, for example, provide power from a portion of the light beam 58 being split off by a light splitter 110 of a type well known in the art such as a half-silvered mirror. One particular use as contemplated for this embodiment of the present invention is shown in FIGS. 16 and 17 wherein the present invention is employed in a medical alert type device as carried by persons with medical problems. As shown in FIG. 16, the card 54' and its elements are contained within a case 112 having appropriate indicia thereon and a ring 114 whereby the case 112 can be hung from a neck or wrist chain. Alternatively, of course, rings 114 can be positioned on either end of the case 112 to configure it as an identification bracelet, as is common for such devices. As shown in FIG. 17, the card 54' within the case 112 is read by placing it in slot 106' of the reader 52 of FIG. 17. Reader 52 has an incandescent bulb 116 at one side of the slot 106' directing light 58 through slots 118 and 120 in the side of the case 112 onto, respectively, solar cell 108 and SLM 76. Light 58' as modulated by the SLM 76 is focused by a lens 122 onto a light detecting diode 124 operating as the light detector 60. An alternate embodiment of the reader 52 is shown in FIG. 22 wherein bulb 116 only provides energy to the solar cell 108 while a laser diode 126 provides the light beam 58 which passes through the SLM 76 and onto the light detecting diode 124.

A major alternate embodiment to the present invention is shown in FIGS. 18-21. In this embodiment, the modulated light source originates at the smart card rather than at the reader as with the previous embodiment. Broadly stated, this embodiment is an active smart card whereas the previously described embodiments were passive smart cards. The card, generally indicated as 128, and its corresponding reader, generally indicated as 130, are shown in block diagram form in FIG. 18. Once again, the active card 128 includes a memory 22, a power supply 80, and light modulation logic 78. Rather than driving the SLM 76, however, the light modulation logic 78 is connected to drive a laser diode 132 producing an IR laser beam 134 modulated with the data from memory 22, which then passes through a beam expander 86 to produce an expanded, modulated laser beam 134'. The card reader 130 is very similar to the card reader 52 of the previous embodiment except that the light source 56 is omitted. Again, there is a light detector 60 having a light sensitive surface 64 upon which the laser beam 134' impinges to provide a signal on output line 62 connected to data demodulation logic 68, which is powered by power supply 66 and has an output 70 connected to computer 72 which uses the data.

The card 128 and its reader 130 are shown in FIG. 19 in use in an environment similar to that of FIG. 10 wherein police car 84 desires to get information about automobile 82. The card 128, again, is placed at the rear of the automobile 82. In its preferred embodiment, card 128 appears as shown in FIGS. 25 and 26 wherein the power supply 80 comprises a plurality of solar cells 108. In use, ambient light 136 (or light 138 from a spotlight 140 on the police car 84) impinges on the solar cells 108 and causes the card 128 to continuously and repeatedly disgorge the data in its memory 22 via the modulated laser beam 134, which is detected by a reader 130 contained in the police car 84.

Permanent and portable readers for this embodiment and analogous to the readers of FIGS. 14 and 15 are shown in FIGS. 20 and 21. The permanent reader 130" of FIG. 20 has a case 88 containing power supply 66, buffer memory 98, detector 60, and demodulation and output logic 68". External input 102 is connected directly to control the demodulation and output logic 68". Again, there is an opening 96 containing a focusing lens 99 for focusing the incident modulated laser beam 134' onto the light sensitive surface 64 of the detector 60. As in the previous embodiment, data is output at 104 for connection to a computer. Except for the elimination of the laser 56', the portable reader 130' of FIG. 21 is substantially identical to the portable reader 52' of FIG. 15. There is a case 88 with a handle 90 containing a trigger 82 connected to control switch 94. In this case, the switch 94 is connected directly to the logic 68'. Again, there is a power supply 66, display 100, buffer memory 98, detector 60, beeper 101, and opening 96 containing focusing lens 99.

Finally, in FIGS. 27 and 28, an automated traffic enforcement system incorporating the present invention for such uses as detecting speeders and issuing citations is shown. Devices are known in the art incorporating a speed detecting radar with a photographic system which takes a picture of the automobile, its license plate, and the occupants, for later data correlation through the photographed license plate. With the active smart card 128 of the present invention as particularly shown in FIGS. 25 and 26 used in addition to or in lieu of an automobiles rear license plate, a fully automated speed limit enforcement system as shown in FIGS. 27 and 28 is not only possible but practical. As shown in FIG. 27, the unit is housed in a box 142 on a post 144 or the like, alongside the road to detect passing vehicles. As automobile 82 passes, the speed radar 146 bounces a doppler radar beam 148 off of the automobile 82 to detect the speed thereof. As depicted in FIG. 28, the unit 150 contains logic at 152 which inputs the speed detected by the speed radar 146. At 154, the logic checks to see if the detected speed is over the limit at that location. If it is not, the logic returns to logic block 152 to await the next speed input. If over the limit, the unit 150 at logic block 156 inputs the data in the buffer memory 98 within the smart card reader 130 contained therein as received via the emitted modulated IR laser beam 134' from the smart card 128 at the rear of the automobile 82. The issue citation logic at block 158 then either prints a citation on printer for subsequent mailing at 160 or transmits the information at 162 back to a central police station 164 where the citation is printed for mailing. If desired, as shown at decision block 166, the logic of the unit 150 can also check to see if the speeding is gross in nature (so as to be an actual safety hazard) and, if it is, as indicated by the block 168, it can transmit a violation in progress to all police cars. This can be accomplished by sending the data on the automobile, the type of violation, and the location of the sending unit as a data message for display on an alpha-numeric display located in the police cars or as a voice message compiled from stored phrases in a manner well known in the art. As can be appreciated, since the automobile data contained within the memory 22 of the automobile's smart card 128 is totally available, the issue citation logic 158 can also be adapted to include checking for current registration, current insurance, and the like, and to issue citations accordingly and provide proper notices to appropriate authorities, if desired. For example, the insurance company could be notified of a speeding citation greater than a threshold level over the posted limit indicating grossly negligent driving (e.g. at 100 mph).

A variation of the above-described system is shown in FIG. 29 wherein the smart card of the present invention can be utilized to eliminate police enforcement of parking, and the like, to free them for more urgent business. The system could be applied to parking lots, parking zones, and privileged parking such as commercial loading and unloading and handicapped parking wherein actual enforcement is woefully lacking. In this case, the logic inputs the automobile data from the smart card reader 130 at 156' and checks it at logic block 170 to see if the parking is legal. If it is not, issue citation logic 158' again transmits the citation data at 162' to the police station 164 for printing and mailing. The logic decision block 170 can check for special parking authorization as issued by the Department of Motor Vehicles (i.e. handicapped parking authorized) or over time limit, etc. as appropriate in the particular application.

Wherefore, having thus described my invention, I claim:

1. In a smart card system comprising a smart card having a digital memory therein containing data and a reader for reading the data from the smart card, the improvement comprising:
   (a) spatial light modulator light modulating means incorporated into the smart card for modulating a continuous light beam passing therethrough from a front side to a back side of said spatial light modulator with the data in the memory;
   (b) light sensing means associated with the reader for detecting said light beam and for demodulating the data therefrom;
   (c) the reader including light producing means for producing said beam of light and for directing it on the smart card; and,
   (d) the smart card including light directing means separate from said light modulating means for receiving said beam of light from the reader, for directing said beam of light through said light modulating means from said front side to said back side, and for directing said beam of light back to said light sensing means of the reader.

2. The improvement to a smart card system of claim 1 wherein said means for directing said beam of light through said light modulating means comprises:
   (a) first reflector means for receiving said beam of light and for directing it into said light modulating means on said front side; and,
   (b) second reflector means for receiving said beam of light from said light modulating means on said back side and for directing it back towards the reader.

3. The improvement to a smart card system of claim 1 wherein said means for directing said beam of light through said light modulating means comprises:
   (a) a first optic fiber segment disposed for receiving said beam of light and for conducting it into said light modulating means on said front side; and,
   (b) a second optic fiber segment disposed for receiving said beam of light from said light modulating means on said back side and for directing it back towards the reader.

4. The improvement to a smart card system of claim 1 and additionally comprising:
   (a) buffer memory means disposed in the reader for receiving and holding the data demodulated by said light sensing means;
   (b) said light sensing means comprising,
   (b1) a detector for developing an electrical signal at an output thereof in response to light incident on a sensitive surface thereof; and,
   (b2) demodulation and output logic means for receiving said electrical signal and for demodulating and outputting the data therefrom; and,
   (c) light focusing means for receiving said beam of light and for focusing it on said sensitive surface.

5. The improvement to a smart card system of claim 4 wherein the reader is contained in a hand-holdable case and additionally comprising:
   (a) light focusing means for receiving said beam of light and for focusing it on said sensitive surface; and,
   (b) means for indicating to a user when the reader is receiving said beam of light.

6. The improvement to a smart card system of claim 5 and additionally comprising:
   display means for reading and displaying the data contained in said buffer memory.

7. A smart card which transmits its stored data by means of modulated light comprising:
   (a) digital memory means carried by the smart card for holding the data as digital information;
   (b) power supply means operably connected for supplying power to the components of the smart card;
   (c) spatial light modulator light modulation means for modulating a light beam passing therethrough from a front side to a back side thereof with the data in said memory and emitting the modulated light beam for subsequent detection and demodulation; and, (d) light directing means mounted on the smart card and independent of said light modulation means for receiving a continuous beam of light from a reader, for directing said beam of light through said light modulating means from said front side to said back side, and for redirecting said beam of light back to said reader.

8. The smart card of claim 7 wherein the reader includes a slot for receiving the smart card therein with light sensing means and said light producing means being disposed on opposite sides of said slot and wherein:

said means for directing said beam of light through said light modulating means comprises a passageway through the card disposed between said light sensing means and said light producing means when the card is disposed in said slot, said light modulating means being disposed in said passageway.

9. The smart card of claim 7 wherein said means for directing said beam of light through said light modulating means comprises:

(a) first reflector means for receiving said beam of light and for directing it into said light modulating means on said front side; and, (b) second reflector means for receiving said beam of light from said light modulating means on said back side and for directing it back towards the reader.

10. The smart card of claim 7 wherein said means for directing said beam of light through said light modulating means comprises:

(a) a first optic fiber segment disposed for receiving said beam of light and for conducting it into said light modulating means on said front side; and, (b) a second optic fiber segment disposed for receiving said beam of light from said light modulating means on said back side and for directing it back towards the reader.

* * * * *